United States Patent
Kawamoto

(10) Patent No.: US 12,409,778 B2
(45) Date of Patent: Sep. 9, 2025

(54) VEHICLE CABIN ILLUMINATION DEVICE

(71) Applicant: MINEBEA MITSUMI Inc., Nagano (JP)

(72) Inventor: Satoshi Kawamoto, Hiroshima (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/848,200

(22) PCT Filed: Dec. 13, 2022

(86) PCT No.: PCT/JP2022/045779
§ 371 (c)(1),
(2) Date: Sep. 18, 2024

(87) PCT Pub. No.: WO2023/188571
PCT Pub. Date: Oct. 5, 2023

(65) Prior Publication Data
US 2025/0206224 A1    Jun. 26, 2025

(30) Foreign Application Priority Data

Mar. 30, 2022 (JP) ................................. 2022-057696

(51) Int. Cl.
*B60Q 3/64* (2017.01)
*B60Q 3/74* (2017.01)
*B60Q 3/76* (2017.01)

(52) U.S. Cl.
CPC ............ *B60Q 3/64* (2017.02); *B60Q 3/74* (2017.02); *B60Q 3/76* (2017.02)

(58) Field of Classification Search
CPC .................... B60Q 3/50–64; B60Q 3/70–78
See application file for complete search history.

(56) References Cited

U.S. PATENT DOCUMENTS

| 10,279,736 B2 * | 5/2019 | Schneider ............... G09F 13/04 |
| 2006/0187659 A1 | 8/2006 | Nawashiro |
| 2018/0118103 A1 | 5/2018 | Sato |

FOREIGN PATENT DOCUMENTS

| JP | 07-040283 U | 7/1995 |
| JP | 2006-232092 A | 9/2006 |

(Continued)

OTHER PUBLICATIONS

International Search Report for corresponding International Application No. PCT/JP2022/045779 mailed Feb. 14, 2023.
(Continued)

*Primary Examiner* — Jason M Han
(74) *Attorney, Agent, or Firm* — Chrisman Gallo Tochtrop LLC

(57) ABSTRACT

Provided is a vehicle cabin illumination device which can be inexpensively constituted with less attenuation of light intensity. The vehicle cabin illumination device is provided with a light source, and a translucent cover, wherein the cover is provided with a light-entering portion to which illumination light from the light source is irradiated, and a reflector which is formed on a surface opposite to cabin side of a vehicle and reflects the illumination light entering the cover toward the cabin side of the vehicle, wherein the light-entering portion has a translucent portion that passes some of the illumination light from the light source toward the cabin side of the vehicle, and an incident portion that enters some of the illumination light from the light source toward inside of the cover.

7 Claims, 13 Drawing Sheets

(56) References Cited

FOREIGN PATENT DOCUMENTS

| | | |
|---|---|---|
| JP | 2009-214677 A | 9/2009 |
| JP | 2018-070066 A | 5/2018 |

OTHER PUBLICATIONS

Written Opinion for corresponding International Application No. PCT/JP2022/045779 dated Feb. 14, 2023.

\* cited by examiner

VEHICLE CABIN ILLUMINATION DEVICE

CROSS-REFERENCE TO RELATED APPLICATIONS

This application is a national stage entry of PCT/JP2022/045779, filed on Dec. 13, 2022, that claims the benefit of priority to Japanese Application No. 2022-057696, filed Mar. 30, 2022, the entire disclosures of which are hereby incorporated herein by reference.

TECHNICAL FIELD

The present invention relates to a vehicle cabin illumination device.

BACKGROUND ART

In general, a illumination device for illuminating a cabin of a vehicle comprises direct illumination for illuminating a predetermined part of the cabin and indirect illumination for improving a cabin atmosphere.

Disclosed is an illumination device of this kind, which comprises: an LED serving as a light source; a light diffusing member for diffusing light from the LED; an optical sheet subjected to hologram processing and so on for reflecting diffused light from the light diffusing member toward the cabin of the vehicle; and a translucent transparent cover having a first light transmitting portion (direct illuminating portion) for directly emitting the diffused light traveling toward the cabin of the vehicle into the cabin of the vehicle, and a second light transmitting portion (indirect illuminating portion) for emitting light reflected by the optical sheet into the cabin of the vehicle, wherein the transparent cover covers the LED, the light diffusing member, and the optical sheet from the cabin of the vehicle (For example, see Patent Literature 1).

PATENT LITERATURE

Japanese Unexamined Patent Application Publication No. 2009-214677

SUMMARY OF INVENTION

Technical Problem

However, in the technique disclosed in Patent Literature 1 above, in addition to the light diffusing member for diffusing light from the light source, it is necessary to provide the optical sheet for diffusing the diffused light for indirect illumination, and the transparent cover.

Further, there is a problem that the light emitted from the light source may pass through the transparent cover after passing through the diffused light member, whereby luminous intensity of illumination light emitted into the cabin of the vehicle may be attenuated.

Considering the above fact, the present invention aims to provide the vehicle cabin illumination device which can be configured at a low cost with less attenuation of light intensity.

Solution to Problem

Form 1

At least one embodiment of the present invention proposes a vehicle cabin illumination device comprising a light source, and a translucent a cover disposed on cabin side of a vehicle and covering the light source, wherein the cover is provided with a light-entering portion to which illumination light from the light source is irradiated, and a reflector formed on a surface opposite to the cabin side of the vehicle and reflecting the illumination light incident in the cover toward the cabin side of the vehicle, wherein the light-entering portion has a translucent portion that allows some of the illumination light from the light source to pass through to the cabin side of the vehicle, and an incident portion that allows some of the illumination light from the light source to enter toward inside of the cover.

Advantageous Effect of Invention

According to at least one embodiment of the present invention, it is possible to provide the vehicle cabin illumination device that can be configured at a low cost with less attenuation of light intensity.

DESCRIPTION OF EMBODIMENT

First Embodiment

A vehicle cabin illumination device 10 according to the present embodiment will be described using FIG. 1 to FIG. 4. The vehicle cabin illumination device 10 of the present embodiment is an illumination device disposed on a ceiling and so on in a vehicle cabin. Incidentally, arrow FR appropriately illustrated in drawings indicates front (front view direction) of the vehicle cabin illumination device 10 illustrated in FIG. 1, arrow UP indicates upper side, and arrow RH indicates right side. In the following description, when directions up-down, front-back, and left-right are used, vertical, front and back, and left and right directions of the vehicle cabin illumination device 10 are illustrated unless otherwise noted.

Configuration of Vehicle Cabin Illumination Device 10

The vehicle cabin illumination device 10 according to the present embodiment is fixed to a ceiling portion and so on in a vehicle cabin as, for example, a room lamp or a reading lamp. The vehicle cabin illumination device 10 receives power supply and so on when a harness (not illustrated) is connected from a vehicle.

Figure 1:
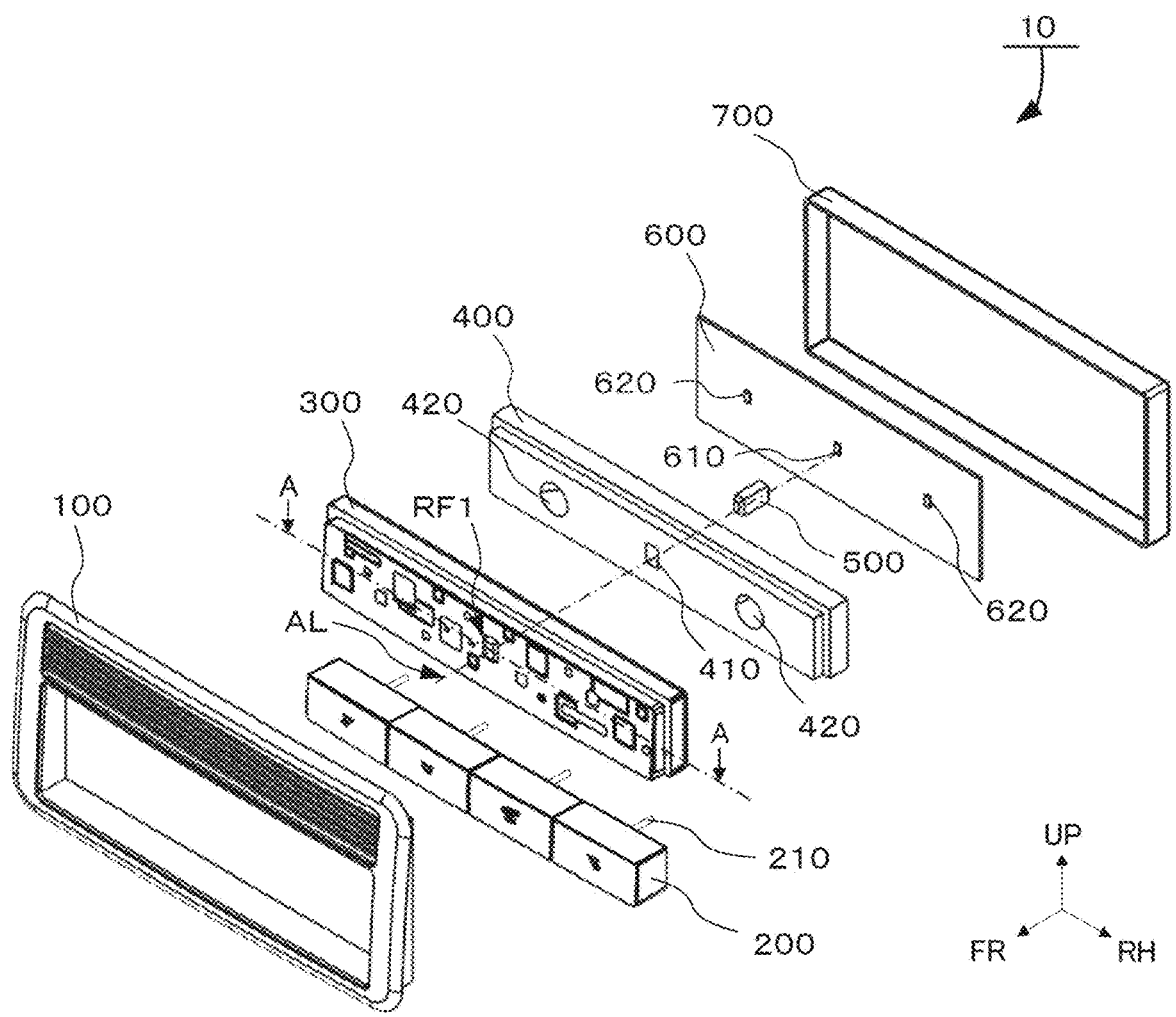
FIG. 1 is a diagrammatic view of an overall configuration of a vehicle cabin illumination device according to a first embodiment.

As illustrated in FIG. 1, the vehicle cabin illumination device 10 according to the present embodiment includes a bezel 100, a switch knob 200, a cover 300, a case 400, a light guide lens 500, a circuit board 600, a light source 610, a light source 620, and a lid 700.

Bezel 100

The bezel 100 is a frame installed on cabin side of the vehicle. The bezel 100 is formed of an impermeable resin and so on in a substantially rectangular shape in front view. The bezel 100 has an opening portion in a center portion, and a switch knob 200 and a cover 300 are fitted into the opening portion. The bezel 100 is constituted as a light shielding wall for preventing illumination light from leaking out from a part other than the opening portion.

Switch Knob 200

The switch knob 200 is an input device for performing operations such as lighting of illumination. The switch knob 200 is integrally formed of resin and so on into the substantially rectangular shape in front view. In the present embodiment, the switch knob 200 is provided with, for example, 4 kinds of functional switches, and when any of the functional switches is pressed, each of them performs independent functional operations. A substantially cylindrical rod push pin 210 extending rearward is formed behind the switch knob 200, and a push switch (not illustrated) mounted on the circuit board 600 and a tip portion of the push pin 210 are disposed close to each other. On front side of the switch knob 200, a plurality of symbol marks (4 parts in the present embodiment) indicating an operation position are provided.

Cover 300

The cover 300 irradiates the cabin of the vehicle with the illumination light from the light source 610 as direct illumination (spot illumination) and indirect illumination by illuminating the entire cover 300. The cover 300 also protects the light sources 610 and 620 by preventing contact with outside.

Figure 2A:
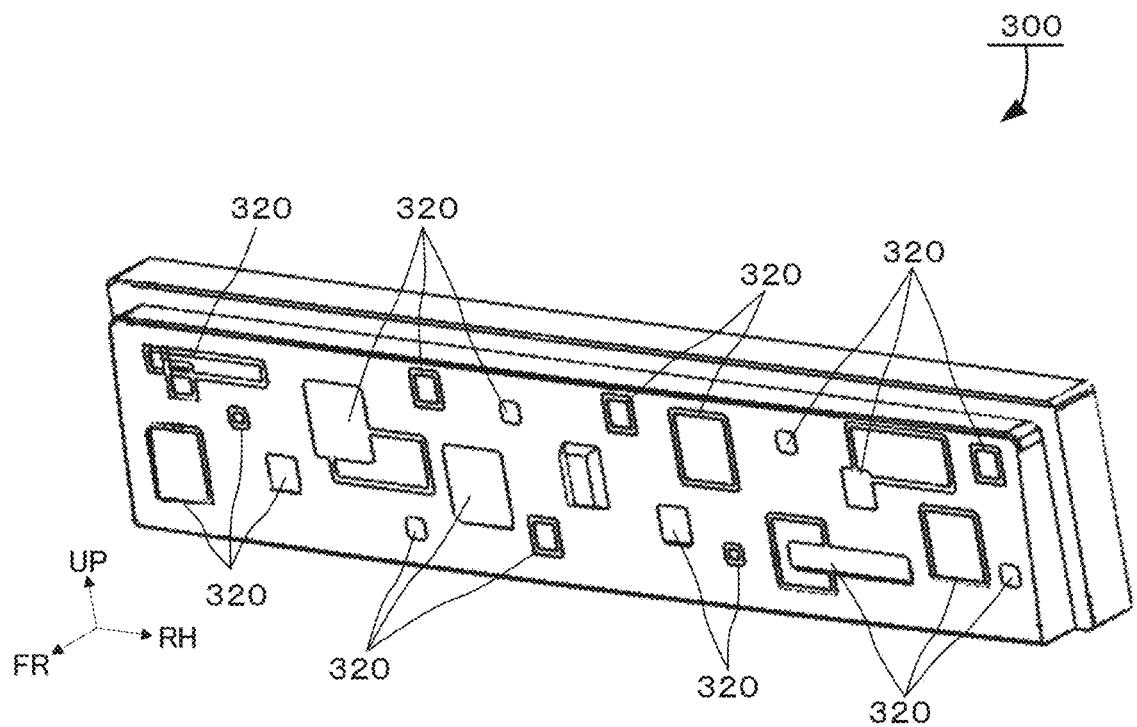
FIG. 2 illustrates a cover illustrated in FIG. 1, FIG. 2A from front upward view and FIG. 2B from the rear upward view.
Figure 2B:
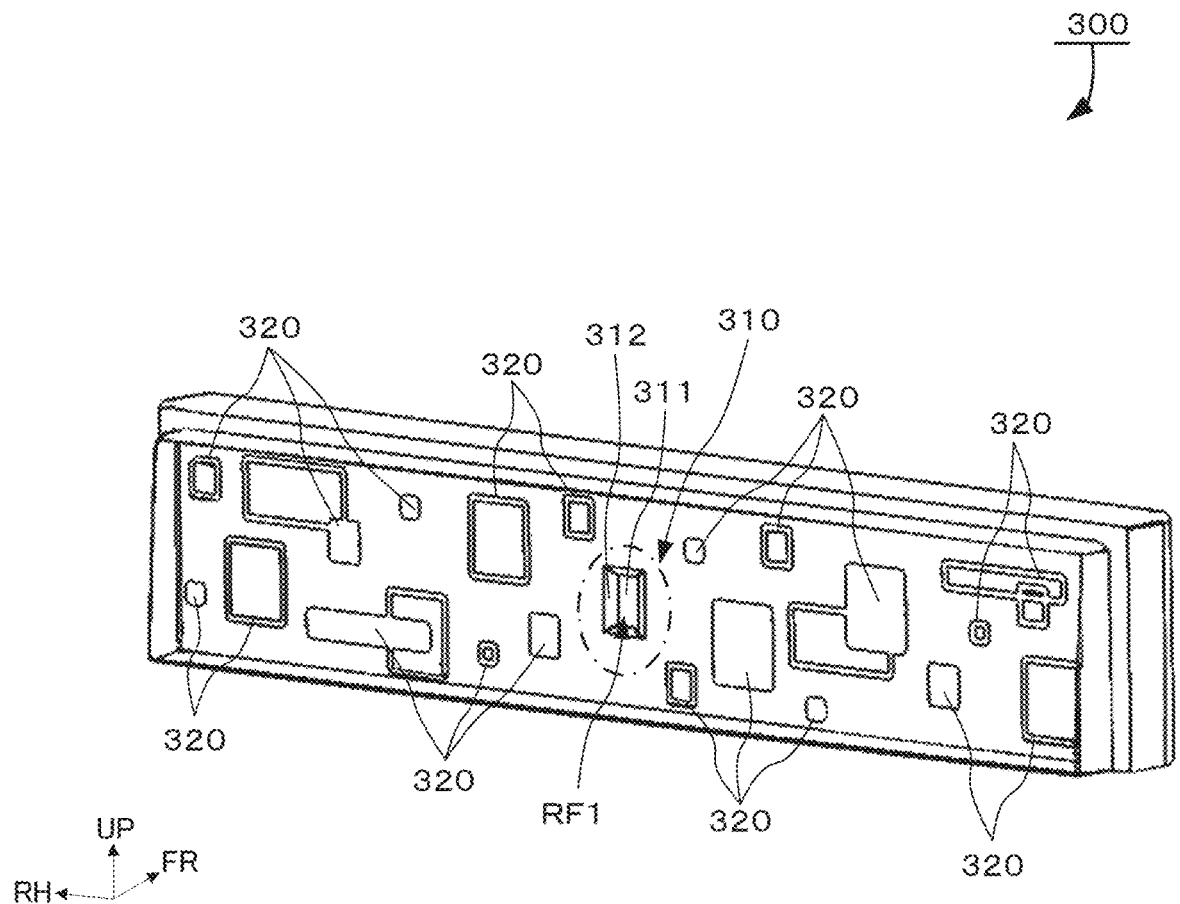

The cover 300 is fitted into the bezel 100 so that a front surface of the cover 300 is disposed on the cabin side of the vehicle and a rear surface is disposed so as to cover the light sources 610 and 620. The cover 300 is in a bottomed box shape opened rearward and is formed of a permeable resin and so on. As illustrated in FIG. 2A, the front surface of the cover 300 faces the cabin side of the vehicle and has a flat surface without any irregularities. On the other hand, the rear surface of the cover 300 has a light-entering portion 310 illustrated by a dashed line in FIG. 2B and a reflector 320 illustrated by a broken line, and a recess portion RF1 is formed in the light-entering portion 310. The front surface of the cover 300 may be a curved surface.

The light-entering portion 310 is irradiated with irradiation light from the light source 610. The light-entering portion 310 is formed opposite to the front of the light source 610 so that a center of the light-entering portion 310 is positioned on an optical axis AL from the light source 610.

The light-entering portion 310 has a recessed shape recessed forward in the center portion of the rear surface of the cover 300. The light-entering portion 310 forms the recess portion RF1 having a translucent portion 311 as a bottom surface and an incident portion 312 as a peripheral wall surface.

The translucent portion 311 passes some of the illumination light from the light source 610 to the cabin side of the vehicle. The illumination light from the translucent portion 311 is irradiated as the direct illumination (spot illumination). The translucent portion 311 is positioned with the optical axis AL from the light source 610 as the center, and is formed in front of the light source 610 as a substantially rectangular plane parallel to the circuit board 600. The incident portion 312 is adjacently formed around the translucent portion 311. Thickness of the translucent portion 311 in the front-back direction is smaller than the thickness of a part of the cover 300 on which the reflector 320 described further below is formed.

The incident portion 312 enters some of the illumination light from the light source 610 toward the inside of the cover 300. The incident portion 312 is the substantially rectangular plane formed so as to surround the light-transmitting portion 311, and a plurality of incident portions 312 are provided around the translucent portion 311. The incident portion 312 is provided with an inclination in direction closer to the circuit board 600 from the center of the optical axis AL of the light source 610 toward radial outside of the optical axis AL.

The reflector 320 is formed on a surface of the cover 300 opposite to the cabin side of the vehicle. The reflector 320 reflects the illumination light entering the cover 300 toward the cabin side of the vehicle, and is formed on the rear surface of the cover 300 as an aggregate of minute projections having an inclined shape such as a substantially triangular pyramid shape. Specifically, the reflector 320 is formed by aggregating projections including minute inclined shapes in a substantially rectangular or rectangular frame shape illustrated in a range surrounded by a thick broken line in FIG. 2B. The reflector 320 diffusely reflects the irradiated irradiation light forward.

Case 400

Figure 3:
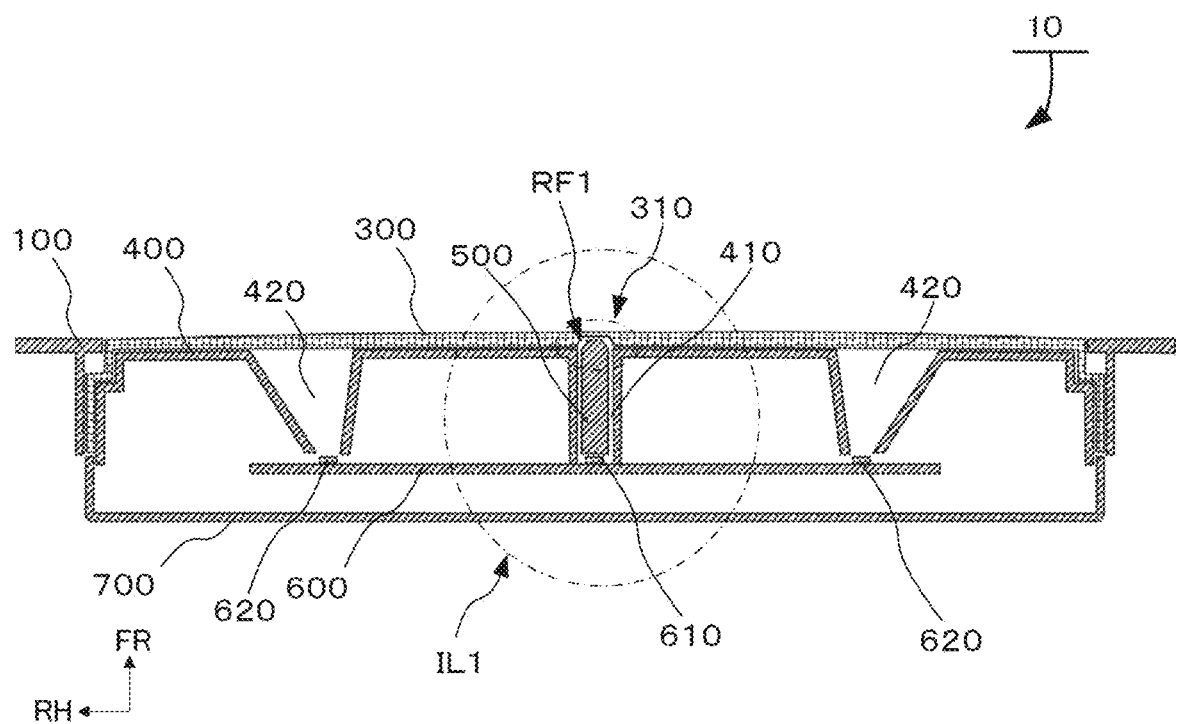
FIG. 3 is a cross-sectional view (cross-sectional view at A-A line position of FIG. 1) of the first embodiment of the vehicle cabin illumination device illustrated in FIG. 1.

As illustrated in FIG. 3, the case 400 is disposed between the cover 300 and the circuit board 600, and is a light guide path for guiding the irradiation light from the light sources 610 and 620 mounted on the circuit board 600 to the cover 300. The case 400 has the bottomed box shape opened rearward, and is formed of the impermeable resin and so on. The light guide path is formed so as to surround the light source 610 and the light source 620. The light guide path is disposed close to the circuit board 600. The case 400 has a light guide cylinder 410 as the light guide path provided in front of the light source 610, and a light guide cylinder 420 as a light guide path for the light source 620 provided on both sides in the left-right direction of the light guide cylinder 410.

The light guide cylinder 410 guides the illumination light from the light source 610 to the light-entering portion 310. The light guide cylinder 410 has a substantially rectangular opening portion in front view and is formed as a substantially rectangular penetrating-space extending in the front-back direction. The light guide cylinder 420 guides the illumination light from the light source 620 to the cabin side of the vehicle. The light guide cylinder 420 has a substantially circular opening portion in front view, and is formed as a substantially conical penetrating space extending in the front-back direction so that a diameter of a circle increases as it moves forward.

Light Guide Lens 500

The light guide lens 500 is disposed in the light guide cylinder 410 of the case 400, and guides the illumination light irradiated from the light source 610 to the light-entering portion 310. An end portion of the light guide lens 500 enters into the recess portion RF1 provided in the cover 300.

The light guide lens 500 is a rod-shaped rectangular parallelepiped extending in the front-back direction in front view and is formed of a translucent resin and so on. A rear end portion of the light guide lens 500 is formed with the rectangular plane parallel to the circuit board 600 and opposed to the light source 610. On the other hand, a plane opposed to the recess portion RF1 of the cover 300 is formed at the front end of the light guide lens 500. Specifically, a transmitting surface 510, which is the plane parallel to the translucent portion 311, is formed at the tip portion opposite to the translucent portion 311. A reflecting surface 520, which is the plane having an inclination in direction closer to the circuit board side toward the outer periphery from the side of the plane of the tip portion, is formed on a side surface of the tip portion opposite to the incident portion 312. The transmitting surface 510 and the reflecting surface 520, which are the end portions of the light guide lens 500, are disposed in a state of entering into the recess portion RF1 of the cover 300.

Circuit Board 600

The circuit board 600 mounts the light source 610 and the light source 620. The circuit board 600 is formed in a substantially rectangular plate shape in front view, and is disposed so that its long sides extend in the left-right direction. The circuit board 600 is disposed in parallel with the cover 300. The light source 610 is mounted substantially in the center of the circuit board 600, and the light source 620 is mounted on the circuit board 600 in the left-right direction. A harness (not illustrated) is connected to the circuit board 600 in order to receive the power supply from the vehicle. The push switch (not illustrated) that receives the operations of the switch knob 200 is mounted on the circuit board 600. The push switch is mounted opposite and close to the end portion of the push pin 210 extending from the switch knob 200.

Lid 700

The lid 700 is positioned at the rearmost position of the vehicle cabin illumination device 10, and is fitted into the bezel 100 so as to cover the switch knob 200, the cover 300, the case 400, the light guide lens 500, and the circuit board 600 and forms the outer shape. The lid 700 fixes the circuit board 600 with a set screw and so on.

Effects

When the switch knob 200 for lighting is pressed, the vehicle cabin illumination device 10 configured as described above uses the power supply from the harness connected from the vehicle to light the light source 610 and the light source 620 mounted on the circuit board 600.

As illustrated in FIG. 3, the illumination light irradiated from the light sources 620 provided on left and right portions of the circuit board 600 passes through the cover 300 through the light guide cylinder 420 provided on the case 400, and is emitted in the cabin of the vehicle as the direct illumination. At this time, strong illumination light is emitted to a predetermined range without being reflected and diffused until it is emitted in the cabin of the vehicle.

Figure 4:
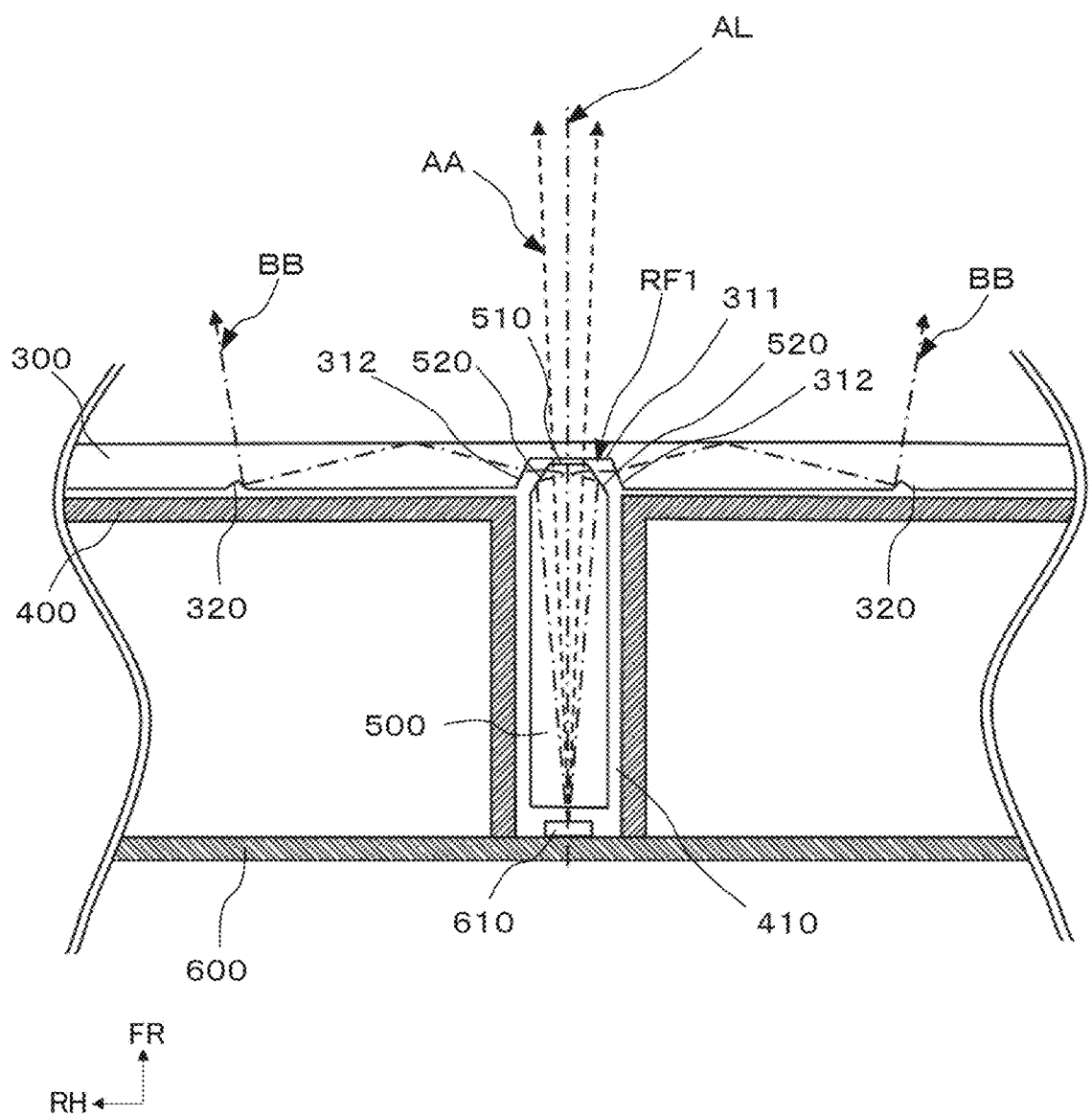
FIG. 4 is an enlarged cross-sectional view of IL1 portion illustrated in FIG. 3 (cross-sectional view at the A-A line position in FIG. 1).

Further, as illustrated by a broken line arrow AA in FIG. 4, the illumination light irradiated from the light source 610 provided in the center portion of the circuit board 600 passes through the inside of the light guide lens 500 housed in the light guide cylinder 410 and reaches the transmitting surface 510 and the reflecting surface 520 provided on the side surface of the tip portion of the light guide lens. The illumination light having reached the transmitting surface 510 is transmitted through the translucent portion 311 of the cover 300, and is emitted in the cabin of the vehicle as the direct illumination. In this case, the strong illumination light is emitted to a narrow range without being reflected and diffused until it is emitted in the cabin of the vehicle.

On the other hand, the illumination light that has reached the reflecting surface 520 is reflected by the inclination of the reflecting surface 520 and guided towards the inside of the cover 300, as illustrated by a dashed line arrow BB in FIG. 4. The illumination light reflected by the reflecting surface 520 passes through the reflecting surface 520 provided on the opposite side of the reflected reflecting surface 520, and reaches the inside of the cover 300 through the incident portion 312 provided on the light-entering portion of the cover 300. At this time, since the reflecting surface 520 is formed with the plane having the inclination opposite to the incident portion 312, the irradiation light reaches the inside of the cover 300 without attenuation.

The irradiation light having reached the inside of the cover 300 reaches the reflector 320 formed on the surface of the cover 300 opposite to the cabin side of the vehicle. The reflector 320 is formed as the aggregate of minute projections having the inclined shape such as the substantially triangular pyramid shape. The irradiation light irradiated on the reflector 320 is diffusely reflected forward by a minute plane formed on the reflector 320. Further, since the reflector 320 is formed in a wide range of the cover 300, the irradiation light is emitted from the entire plane of the cabin of the vehicle on the cover 300. The irradiation light is emitted as the indirect illumination from the entire surface of the cover 300 facing the cabin of the vehicle.

As described above, the vehicle cabin illumination device 10 according to the present embodiment is provided with the light source 610 and the light source 620 provided on the circuit board, and the translucent cover 300 disposed on the cabin side of the vehicle and covering the light source 610 and the light source 620. The cover 300 is provided with the light-entering portion 310 to which the illumination light from the light source 610 is irradiated, and the reflector 320 formed on the surface opposite to the cabin side of the vehicle and reflecting the illumination light entered into the cover 300 toward the cabin side of the vehicle. The light-entering portion 310 has the translucent portion 311 for allowing some of the illumination light from the light source 610 to pass toward the cabin side of the vehicle, and the incident portion 312 for allowing some of the illumination light from the light source 610 to enter the inside of the cover 300. Therefore, the cover 300 protects the light sources 610 and 620 by covering them so that they are not in contact with the outside, and splits the irradiation light from the light source 610 by the translucent portion 311 and the incident portion 312, whereby the direct illumination and the indirect illumination can be irradiated from one light source 610. The light-entering portion 310 is provided with the recess portion RF1 having the bottom surface serving as the translucent portion 311 and a side wall serving as the incident portion 312. The incident portion 312 is provided with the inclination in the direction closer to the circuit board 600 from the center of the optical axis of the light source 610 toward the radial outside of the optical axis. Therefore, by providing the incident portion 312 with the inclination on the incident portion 310 to which the irradiation light from the light source 610 is irradiated, the irradiation light used for the indirect illumination can be spectrally separated with a simple configuration and less attenuation. The light guide cylinder 410 as the light guide path from the light source 610 to the light-entering portion 310 is provided between the cover 300 and the circuit board 600. The translucent portion 311 and the incident portion 312 of the recess portion RF1 are disposed so as to oppose to the internal space of the light guide cylinder 410 and the optical axis of the light source 610. The light guide lens 500 for guiding the light from the light source 620 to the light-entering portion 310 is disposed in the light guide cylinder 410 as the light guide path. The end portion of the light guide lens 500 enters the recess portion RF1. Therefore, the irradiation light irradiated from the light source 610 is guided to the light-entering portion 310 in the state surrounded by the light guide cylinder 410. The transmitting surface 510 and the reflecting surface 520 provided at the end portion of the light guide lens 500 enter the recess portion RF1 in which the light-entering portion 310 is provided, so that the irradiation light can reach the light-entering portion 310 with less attenuation of the irradiation light. Further, since the illumination light incident from the incident portion 312 is guided to the reflector 320 through the inside of the cover 300, the cover 300 alone can constitute a functional component of the light guiding, reflecting, and a protective cover, and can be made thin. Therefore, it is possible to have the simple configuration with a small number of components, and it is possible to provide an inexpensive vehicle cabin illumination device with less attenuation of light intensity.

Second Embodiment

Figure 5:
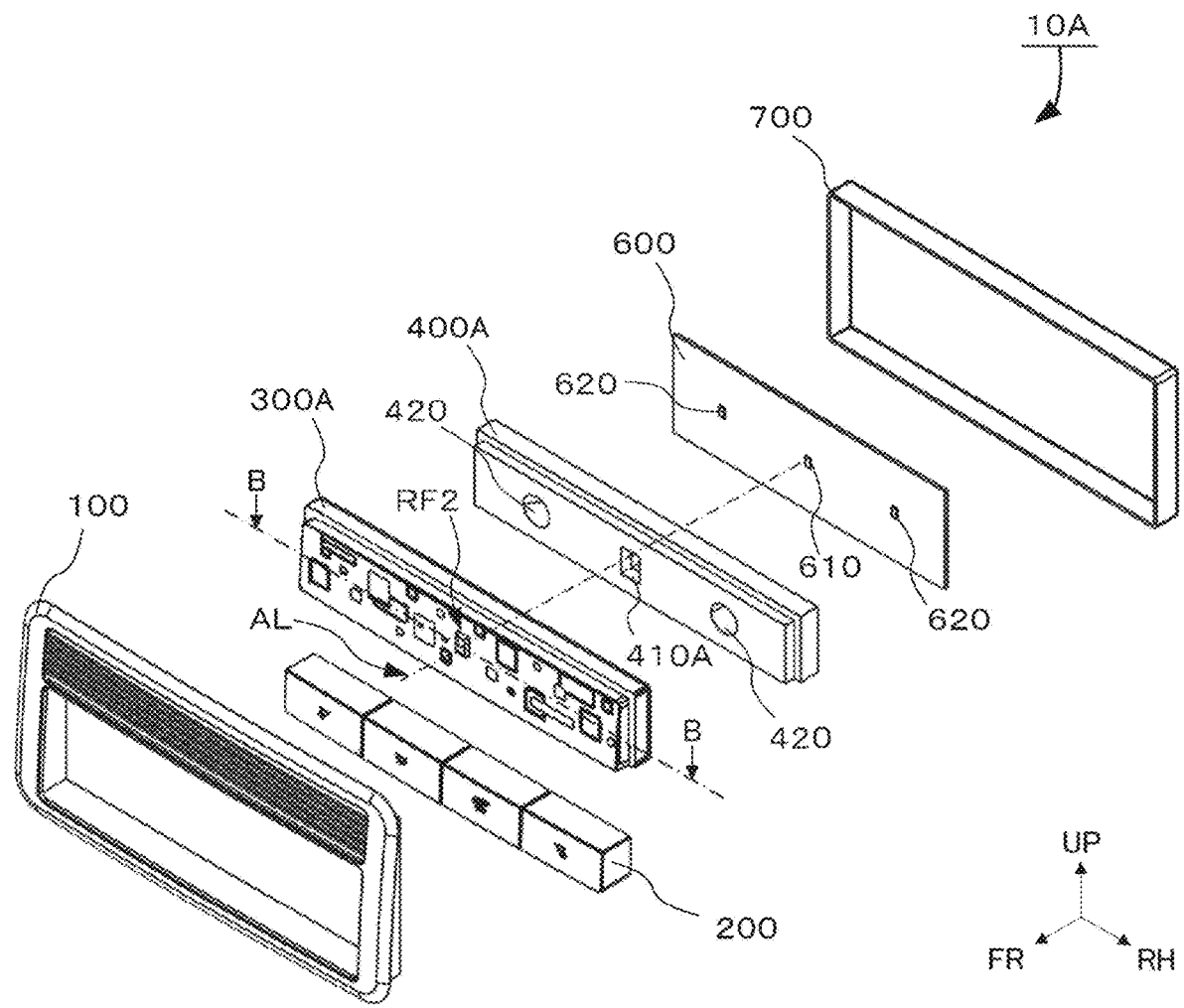
FIG. 5 is a diagrammatic view of an overall configuration of a vehicle cabin illumination device according to a second embodiment.
Figure 6:
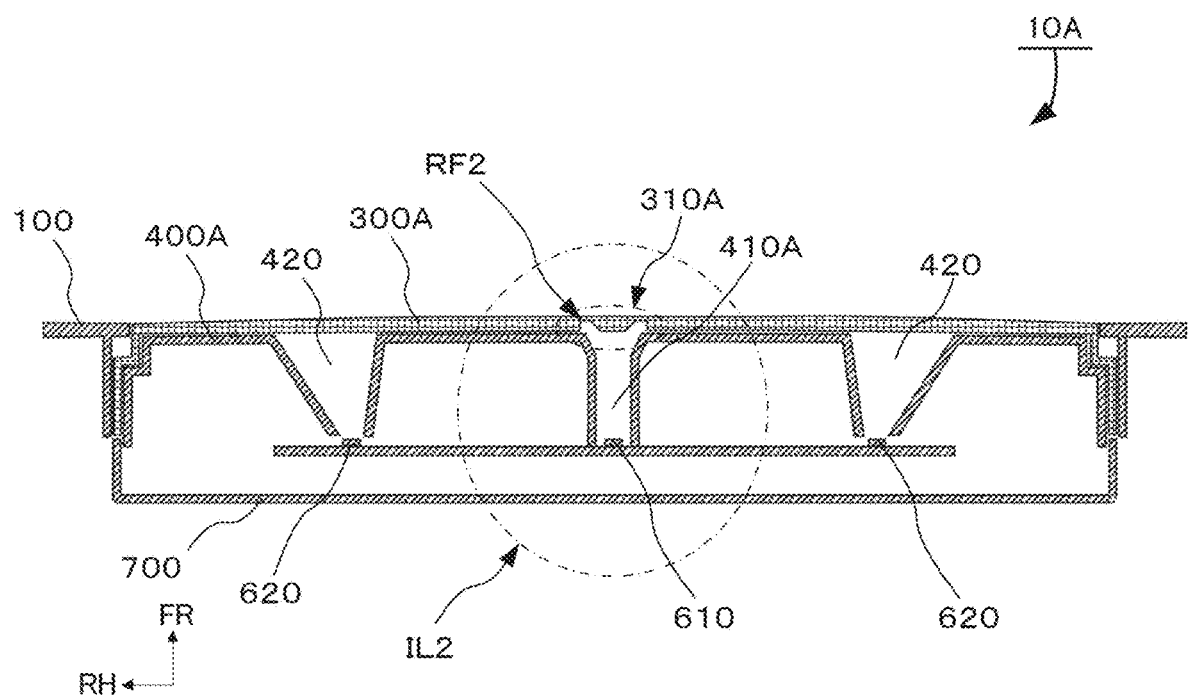
FIG. 6 is a cross-sectional view (cross-sectional view at B-B line position in FIG. 5) of the second embodiment of the vehicle cabin illumination device illustrated in FIG. 5.
Figure 7:
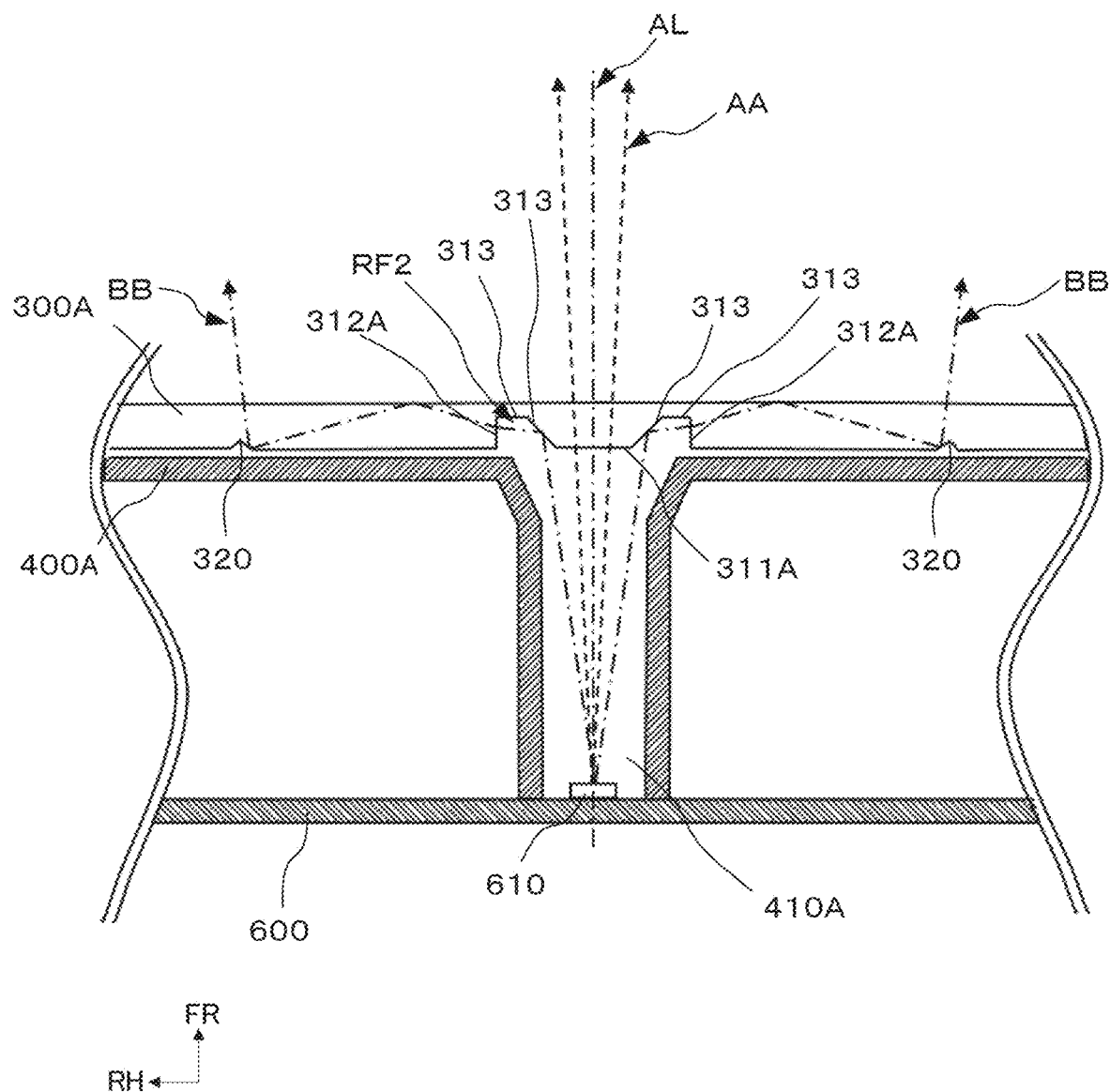
FIG. 7 is an enlarged cross-sectional view of IL2 portion illustrated in FIG. 6 (cross-sectional view at the B-B line position of FIG. 5).

Next, a vehicle cabin illumination device 10A according to the present embodiment will be described using FIG. 5 to FIG. 7. In FIG. 5 to FIG. 7, the same reference numerals are assigned to the same components as those of a vehicle cabin illumination device 10 of a first embodiment.
Configuration of Vehicle cabin illumination device 10A As illustrated in FIG. 5, the vehicle cabin illumination device 10A according to the present embodiment includes a bezel 100, a switch knob 200, a cover 300A, a case 400A, a circuit board 600, a light source 610, a light source 620, and a lid 700.
Cover 300A The cover 300A has a bottomed box shape opened rearward and is formed of a permeable resin and so on. As illustrated in FIG. 6 and FIG. 7, the cover 300A has a light-entering portion 310A and a reflector 320 on a rear surface, and a recess portion RF2 recessed forward is formed in the light-entering portion 310A.

The light-entering portion 310A is irradiated with irradiation light from a light source 610. The light-entering portion 310A is formed opposite to the front of the light source 610 so that center of the light-entering portion 310A is positioned on an optical axis AL from the light source 610. The light input portion 310A has a recessed shape recessed forward in a center portion of the rear surface of the cover 300A, and a recessed portion RF2 is formed on radial outside of the optical axis AL with a translucent portion 311A as a bottom surface and an incident portion 312A as a surrounding wall surface. In the recess portion RF2, a convex portion having a substantially trapezoidal cross section is formed in the center portion of the bottom surface of the recess portion RF2 by protruding a substantially rectangular plane toward the circuit board 600. The trans-lucent portion 311A, the incident portion 312A, and a reflecting surface 313 are formed in the recess portion RF2.

The translucent portion 311A is the substantially rectangular plane formed on a top surface of the convex portion in the recess portion RF2. A plane formed on the top surface of the convex portion is formed as the plane which positions the optical axis AL from the light source 610 at the center of the top surface of the convex portion and is parallel to the circuit board 600 in front of the light source 610.

The incident portion 312A is the substantially rectangular plane formed by a wall surface portion outside in the radial direction of the optical axis AL of the recess portion RF2, and a plurality of incident portions 312A are provided to surround the recess portion RF2. The incident portion 312A is formed substantially parallel to the optical axis AL.

The reflecting surface 313 is formed by the wall surface of the convex portion at the center portion of the recess portion RF2 and the substantially rectangular plane formed on the bottom surface of the recess portion RF2. A plurality of wall surfaces of the center convex portion of the recess portion RF2 are formed so as to surround the convex portion. The wall surface of the convex portion of the center portion of the recess portion RF2 is provided with an inclination in direction closer to a cabin of a vehicle from the center of the optical axis AL of the light source 610 toward the radial outside of the optical axis AL. The substantially rectangular plane formed on the bottom surface of the recess portion RF2 is formed so as to surround the convex portion and is formed in front of the light source 610 as the plane parallel to the circuit board 600. The reflecting surface 313 is formed in a mirror-like shape by vapor deposition and so on.
Case 400A The case 400A is disposed between the cover 300A and the circuit board 600, and is a light guide path for guiding the irradiation light from the light sources 610 and 620 mounted on the circuit board 600 to the cover 300A.

As illustrated in FIG. 7, the light guide cylinder 410A formed in the case 400A guides illumination light from the light source 610 to the light-entering portion 310A. The light guide cylinder 410A has a substantially rectangular opening portion in front view, and is formed as a substantially rectangular penetrating space extending in front-back direction. Further, a cabin end portion of the vehicle of the light guide cylinder 410A is inclined and widened toward the radial outside of the optical axis AL so that the illuminating light from the light source 610 is irradiated to the translucent portion 311A of the outside.

Effects

When the switch knob 200 for lighting is pressed, the vehicle cabin illumination device 10A configured as described above lights the light source 610 and the light source 620 mounted on the circuit board 600 by using power supply from a harness connected from the vehicle.

As illustrated by a broken line arrow AA in FIG. 7, the illumination light irradiated from the light source 610 provided at the center portion of the circuit board 600 passes through inside of the light guide cylinder 410A, passes through the translucent portion 311A of the cover 300A, and is emitted in the cabin of the vehicle as direct illumination. In this case, strong illumination light is emitted to a narrow range without being reflected and diffused until it is emitted in the cabin of the vehicle.

On the other hand, the illumination light that has reached the reflecting surface 313 is reflected by the inclination of the reflecting surface 313, as illustrated by a dashed line arrow BB of in FIG. 7, and reaches the inside of the cover 300A through the incident portion 312A. At this time, the reflecting surface 313 is formed with the plane having the inclination opposite to the incident portion 312A on which the illumination light is incident, so that the illumination light reaches the inside of the cover 300A without attenuation.

The irradiation light having reached the inside of the cover 300A reaches the reflector 320 formed on a surface of the cover 300A on the side opposite to the cabin side of the vehicle, and diffusely reflects forward. The illumination light is emitted as indirect illumination from the entire surface of the cover 300A facing the cabin of the vehicle.

As described above, in the vehicle cabin illumination device 10A according to the present embodiment, the light-entering portion 310A of the cover 300A comprises: the recess portion RF2 having a side wall serving as the incident portion 312A; the translucent portion 311A protruding from the bottom surface of the recess portion RF2 toward the circuit board 600 and its top surface is opposed to the light source 610; and a reflecting surface 313 having the outer peripheral surface of the translucent portion 311A inclined in the radial direction and reflecting light from the light source 610 toward the incident portion 312A. That is, the translucent portion 311A, the incident portion 312A, and the reflecting surface 313 are provided on the light-entering portion 310A to which the irradiation light from the light source 610 is irradiated. By irradiating one light source 610 to one light incoming portion 310A, the irradiation light can be distributed to the irradiation light passing through the translucent portion 311A used for the direct illumination and the irradiation light passing through the incident portion 312A used for the indirect illumination. In addition, since the illumination light incident from the incident portion 312A is guided to the reflector 320 through the inside of the cover 300A, the cover 300A alone can constitute a functional component of the spectroscopic, light guiding, reflecting, and a protective cover, and can be made thin. Therefore, it is possible to have a simple configuration with a small number of components, and to provide an inexpensive vehicle cabin illumination device with less attenuation of light intensity.

Third Embodiment

Figure 8:
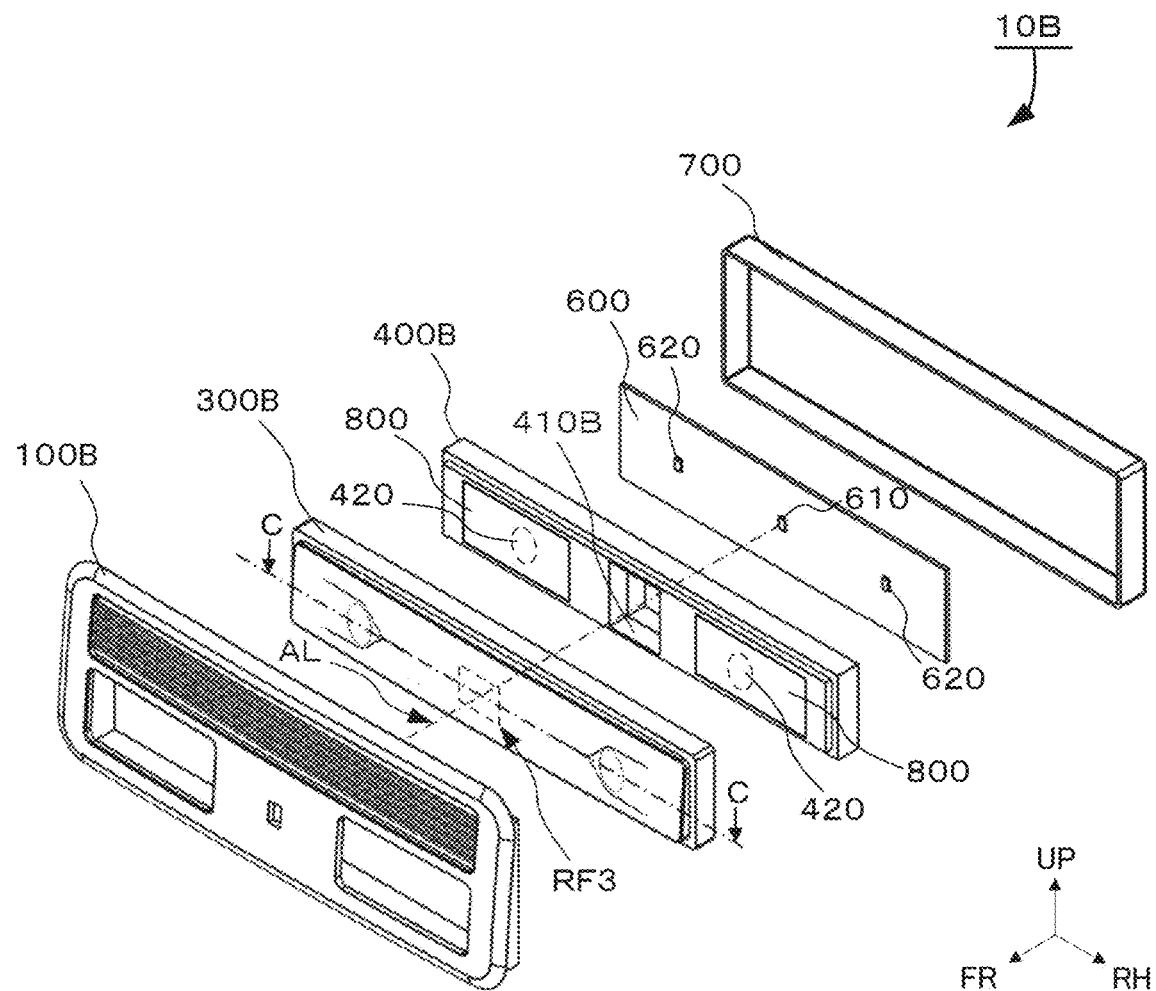
FIG. 8 is a diagrammatic view of an overall configuration of a vehicle cabin illumination device according to a third embodiment.
Figure 9:
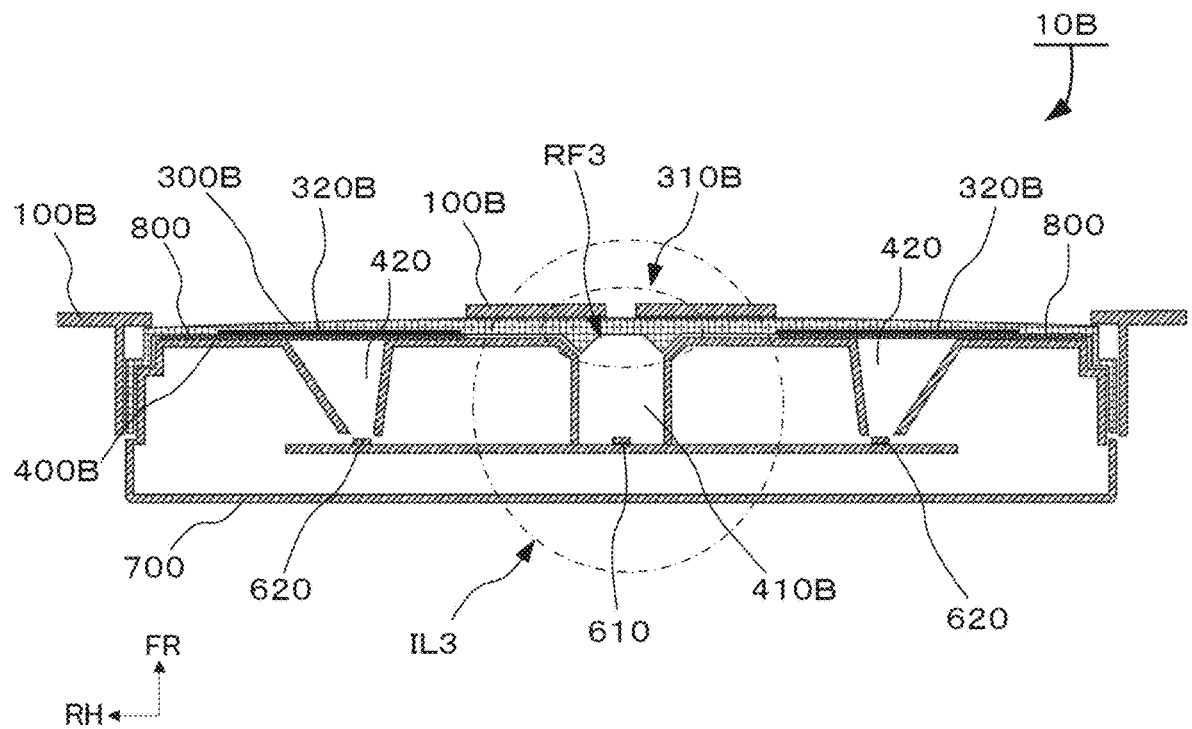
FIG. 9 is a cross-sectional view (cross-sectional view at C-C line position in FIG. 8) of the third embodiment of the vehicle cabin illumination device illustrated in FIG. 8.
Figure 10:
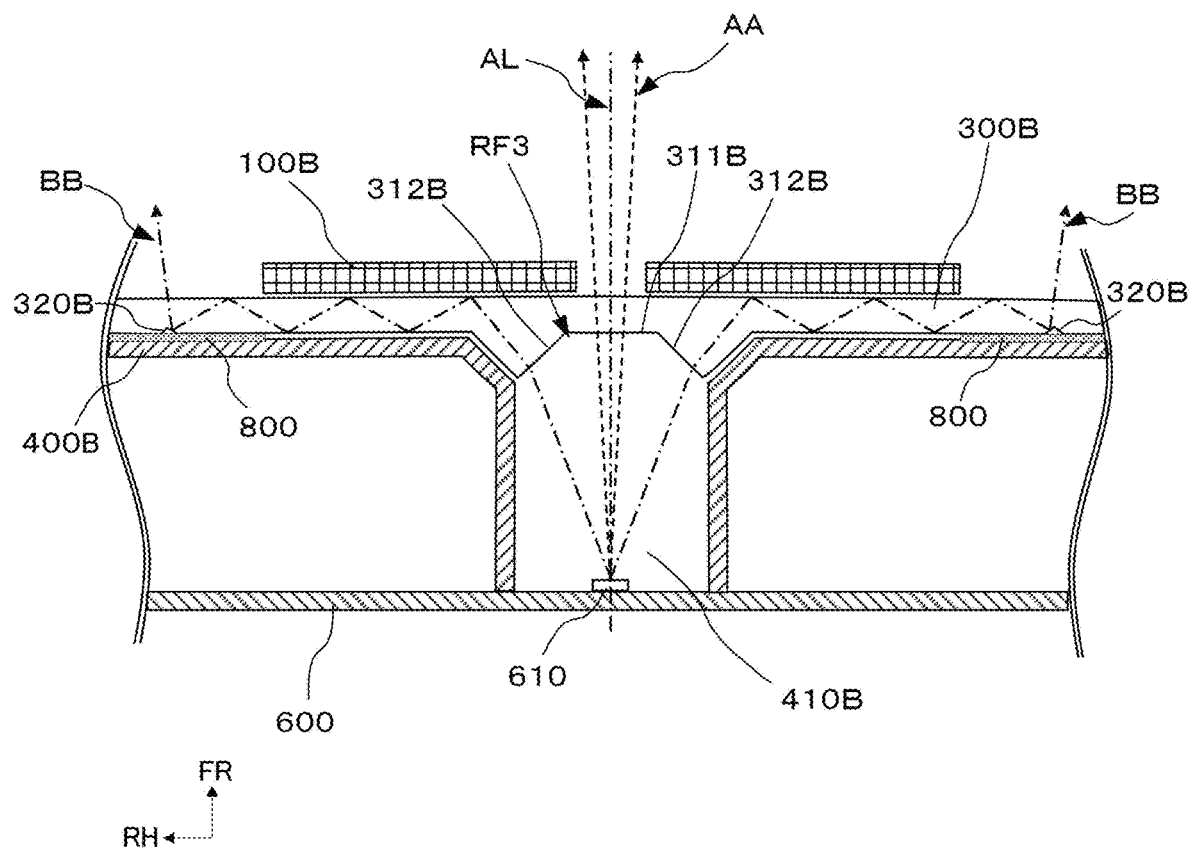
FIG. 10 is an enlarged cross-sectional view of IL3 portion illustrated in FIG. 8 (cross-sectional view at the C-C line position in FIG. 8).

Next, a vehicle cabin illumination device 10B according to the present embodiment will be described using FIG. 8 to FIG. 10. In FIG. 8 to FIG. 10, the same reference numerals are assigned to the same components as those of a vehicle cabin illumination device 10 of a first embodiment.
Configuration of Vehicle Cabin Illumination Device 10B As illustrated in FIG. 8, the vehicle cabin illumination device 10B according to the present embodiment includes a bezel 100B, a cover 300B, a case 400B, a circuit board 600, a light source 610, a light source 620, a lid 700, and an operation detector 800.
Bezel 100B The bezel 100B has opening portions on left and right sides, for example, and the cover 300B is fitted into the opening portions. The bezel 100B has a substantially rectangular opening portion penetrating in front-back direction for emitting irradiation light of direct illumination at a center portion. The bezel 100B is configured as a light shielding wall for preventing illumination light from leaking out from a part other than the opening portion. The opening portion of the bezel 100B may have a shape in which right and left opening portions are coupled.
Cover 300B The cover 300B has a bottomed box shape opened rearward and is formed of a permeable resin and so on. As illustrated in FIG. 9, the cover 300B has a light-entering portion 310B on a rear surface, and a recess portion RF3 recessed forward is formed in the light-entering portion 310B.

The light entering portion 310B is irradiated with irradiation light from a light source 610. The light-entering portion 310B is formed to face the front of the light source 610 so that the center of the light-entering portion 310B is positioned on an optical axis AL from the light source 610. The light-entering portion 310B has a translucent portion 311B, which is formed in a substantially rectangular plane in front view, as a bottom surface in the center portion of the rear surface of the cover 300, and the recess portion RF3 formed on radial outside of the optical axis AL with an incident portion 312B as a surrounding wall surface. In the recess portion RF3, the translucent portion 311B and the incident portion 312B are formed.

The translucent portion 311B is formed as the substantially rectangular plane formed on the bottom surface of the recess portion RF3. A plane of the translucent portion 311B is positioned with the optical axis AL from the light source 610 as a center, and is formed as the plane parallel to the circuit board 600 in front of the light source 610.

The incident portion 312B is the substantially rectangular plane formed on a wall surface portion on the radial outside of the optical axis AL of the recess portion RF3, and a plurality of incident portions 312B are provided to surround the recess portion RF3. The incident portion 312B is provided with an inclination in direction closer to the circuit board 600 from the center of the optical axis AL of the light source 610 toward the radial outside of the optical axis AL.

Reflectors 320B are disposed in groups near the operation detector 800 to be described further below so as to have a shape indicating an operation position of the operation detector 800. Alternatively, the reflectors 320B are disposed in groups as to form a shape of a figure, a number or a character. The reflector 320B displays a symbol mark or a logo indicating the operation position with illumination light by forming angles, heights, shapes and so on of respective reflectors in different shapes.
Case 400B The case 400B is disposed between the cover 300B and the circuit board 600, and is a light guide path for guiding the irradiation light from the light sources 610 and 620 mounted on the circuit board 600 to the light-entering portion 310B.

As illustrated in FIG. 9, the light guide cylinder 410B formed in the case 400B guides the illumination light from the light source 610 to the light-entering portion 310B. The light guide cylinder 410B has the substantially rectangular opening portion in front view and is formed as a substantially rectangular penetrating space extending in the front-back direction.
Operation Detector 800

The operation detector 800 is, for example, a capacitance sensor for detecting a user operation. The operation detector 800 is formed on a transparent sheet that transmits the irradiation light from rear. The operation detector 800 is disposed between the cover 300B and the case 400B at a position corresponding to the opening portion of the bezel 100B, and is connected to the circuit board 600 by a flexible board and so on (not illustrated). An operation of the operation detector 800 is detected by a control circuit (not illustrated) of the circuit board 600, and the control circuit executes lighting and so on. The operation detector 800 may be formed on the circuit board 600 instead of on the transparent sheet.

Effects

When the operation detector 800 for lighting detects the user operation, the vehicle cabin illumination device 10B configured as described above uses power supplied from a harness connected from a vehicle to light the light source 610 and the light source 620 mounted on the circuit board 600.

As illustrated by a broken line arrow AA in FIG. 10, the illumination light irradiated from the light source 610 provided in the center portion of the circuit board 600 passes through inside of the light guide cylinder 410B, passes through the translucent portion 311B of the cover 300B, and is emitted as the direct illumination in a cabin of the vehicle from the opening portion provided in the center portion of the bezel 100B. In this case, strong illumination light is emitted to a narrow range without being reflected and diffused before it is emitted in the cabin of the vehicle.

On the other hand, the illumination light that has reached the incident portion 312B reaches the inside of the cover 300A through the incident portion 312B without attenuation, as illustrated by a dashed line arrow BB of in FIG. 10.

Figure 11A:
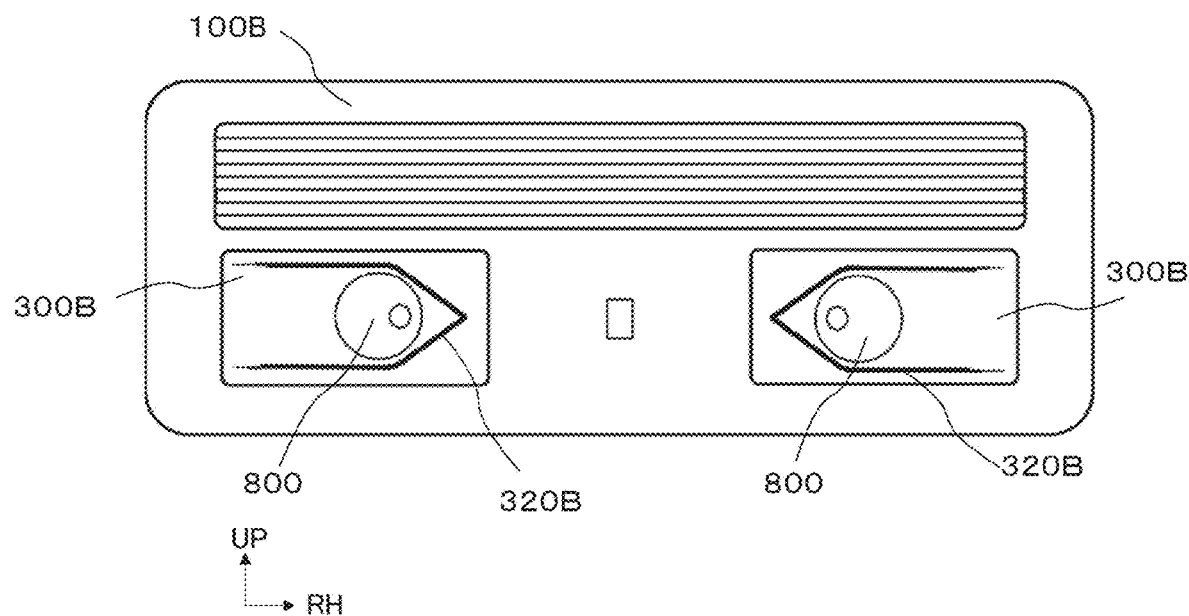
FIG. 11 is a front view illustrating display examples FIG. 11A and FIG. 11B of the vehicle cabin illumination device according to the third embodiment.
Figure 11B:
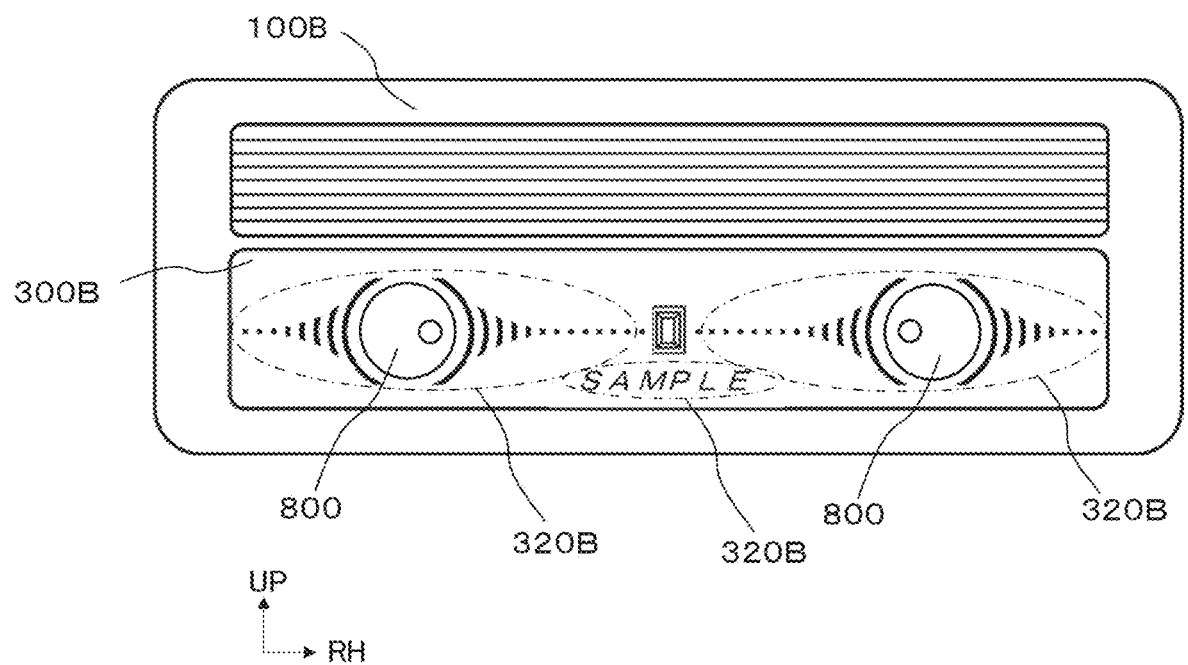

The irradiation light having reached the inside of the cover 300B reaches the reflector 320B formed on the surface of the cover 300B opposite to the cabin side of the vehicle and diffusely reflects forward. As illustrated in FIG. 11A and FIG. 11B, the reflector 320B is formed near the operation detector 800, and is disposed so as to irradiate the illumination light to an intended position by forming angles, heights, shapes, and so on of the respective reflectors into different shapes. Therefore, the emitted illumination light can be shaped to indicate the operation position. Alternatively, the emitted illumination light may be in the form of the figure, the number, or the character.

As described above, the vehicle cabin illumination device 10B according to the present embodiment comprises the operation detector 800 for detecting an operation, and the reflectors 320B are disposed in groups so that they form the shape indicating the operation position of the operation detector 800 near the operation detector 800. Alternatively, in the vehicle cabin illumination device 10B according to the present embodiment, the reflectors 320B are disposed so as to be grouped in the shapes of the figure, the number, and the character. Therefore, by guiding the illumination light emitted from one light source 610 to one light-entering portion 310A to the reflectors 320B formed in different shapes with different angles, heights, shapes and so on of the respective reflectors, the shape such as a symbol mark indicating the operation position or a design such as the logo can be displayed with the illumination light. In addition, since the illumination light incident from the incident portion 312B is guided to the reflector 320 through the inside of the cover 300A, the cover 300B alone can constitute a functional component of the spectroscopic, light guiding, reflection, and a protective cover, and can be made thin. Therefore, it is possible to have a simple configuration with a small number of components, and it is possible to provide an inexpensive vehicle cabin illumination device with improved added value and less attenuation of light intensity.

In the first to third embodiments, the reflector 320 and the reflector 320B are formed toward the inside (front) from the rear surface of each of the cover 300 to the cover 300B, but may be formed to protrude outward (rear) from the rear surface of each of the cover 300 to the cover 300B.

In the first to third embodiments, the light sources 610 and 620 are configured to be lit simultaneously, but they may be configured to be lit separately.

In the first to third embodiments, the light source 610 is lit in response to the operation of the switch knob 200, but it may be configured to light on and off in conjunction with a headlight of the vehicle.

Although the embodiment of the present invention has been described in detail with reference to the drawings, the specific configuration is not limited to the present embodiment, and designs and so on within a range not departing from the gist of the present invention are also included.

EXPLANATION OF THE REFERENCE NUMERALS

10: Vehicle cabin illumination device
100: Bezel
100B: Bezel
200: Switch Knob
300: Cover
300A: Cover
300B: Cover
311: Translucent portion
311A: Translucent portion
311B: Translucent portion
312: Incident portion
312A: Incident portion
312B: Incident portion
313: Reflecting surface
320: Reflector
400: Case
400A: Case
400B: Case
410: Light guide cylinder
500: Light guide lens
600: Circuit board
610: Light source
700: Lid
800: Operation detector
AL: Optical axis
RF1: Recess portion
RF2: Recess portion
RF3: Recess portion

The invention claimed is:
1. A vehicle cabin illumination device comprising:
a light source; and
a translucent cover disposed on cabin side of a vehicle and covering the light source,
wherein the cover is provided with a light-entering portion to which illumination light from the light source is irradiated, and a reflector formed on a surface opposite to the cabin side of the vehicle and reflecting the illumination light entering the cover toward the cabin side of the vehicle,
wherein the light-entering portion has a translucent portion that allows some of the illumination light from the light source to pass through to the cabin side of the vehicle, and an incident portion that allows some of the illumination light from the light source to enter toward inside of the cover.
2. The vehicle cabin illumination device according to claim 1, wherein the light entering portion comprises a recess portion having a bottom surface as a translucent portion and a side wall as the incident portion, wherein the incident portion is provided with an inclination in direction closer to a circuit board from a center of an optical axis from the light source toward a radial outside of the optical axis.

3. The vehicle cabin illumination device according to claim 2 wherein a light guide cylinder serving as a light guide path from the light source to the light entering portion is provided between the cover and the light source, and the translucent portion and the incident portion of the recess portion are disposed so as to oppose to an internal space of the light guide cylinder portion and the optical axis direction.

4. The vehicle cabin illumination device according to claim 3 wherein a light guide lens for guiding light from the light source to the light entering portion is disposed in the light guide path, and an end portion of the light guide lens enters into the recess portion.

5. The vehicle cabin illumination device according to claim 1, wherein the light entering portion comprises:

a recess portion having a side wall as the incident portion;

the translucent portion protruding from a bottom surface of the recess portion toward a circuit board and its top surface is opposed to the light source; and a reflecting surface formed so that an outer peripheral surface of the translucent portion is inclined in radial direction and reflects light from the light source toward the incident portion.

6. The vehicle cabin illumination device according to claim 1 comprising an operation detector for detecting an operation, wherein the reflectors are disposed in groups near the operation detector so as to form a shape indicating an operation position of the operation detector.

7. The vehicle cabin illumination device according to claim 1 wherein the reflectors are disposed in groups to form a figure, a number, or a character shape.

\* \* \* \* \*